United States Patent [19]
Schlaeger

[11] 3,985,242
[45] Oct. 12, 1976

[54] DUNNAGE FILLER

[75] Inventor: Gary D. Schlaeger, Columbia Heights, Minn.

[73] Assignee: Burlington Northern Inc., St. Paul, Minn.

[22] Filed: July 14, 1975

[21] Appl. No.: 595,517

[52] U.S. Cl. .............................. 214/10.5 R; 105/487; 105/491; 206/521; 229/14 C
[51] Int. Cl.² .................... B65G 1/14; B61D 45/00
[58] Field of Search ................. 214/10.5 R, 10.5 D; 105/376, 497, 502, 486, 487, 490, 491; 206/521; 229/14 C; 114/101; 144/192, 193 R, 193 A, 193 B, 193 C, 193 D, 193 E, 193 F, 193 G, 193 H, 193 J, 193 K, 194

[56] References Cited
UNITED STATES PATENTS

| | | | |
|---|---|---|---|
| 2,022,325 | 11/1935 | Schroeder | 105/490 |
| 2,053,638 | 9/1936 | Schroeder | 105/491 |
| 3,072,270 | 1/1963 | Tolby et al. | 214/10.5 D |
| 3,421,451 | 1/1969 | Brucks | 229/14 C X |
| 3,464,367 | 9/1969 | Latter | 229/14 C X |
| 3,581,675 | 6/1971 | Kauffman | 229/14 C X |
| 3,593,671 | 7/1971 | Bramlett | 105/376 X |
| 3,618,535 | 11/1971 | Hees | 105/486 X |
| 3,678,865 | 7/1972 | Van Etten | 105/490 X |
| 3,788,498 | 1/1974 | Slusher | 214/10.5 R |
| 3,861,538 | 1/1975 | Locke | 214/10.5 R |

FOREIGN PATENTS OR APPLICATIONS

| | | | |
|---|---|---|---|
| 1,050,187 | 8/1953 | France | 144/193 D |
| 815,659 | 7/1959 | United Kingdom | 214/10.5 R |

Primary Examiner—Robert S. Ward, Jr.
Attorney, Agent, or Firm—Merchant, Gould, Smith, Edell, Welter & Schmidt

[57] ABSTRACT

A dunnage filler comprising a pair of wedge members complimentarily positioned one above the other in mutual contact, together with means for preventing any relative movement therebetween except for sliding longitudinally, of their contacting surfaces, several such means being shown.

13 Claims, 16 Drawing Figures

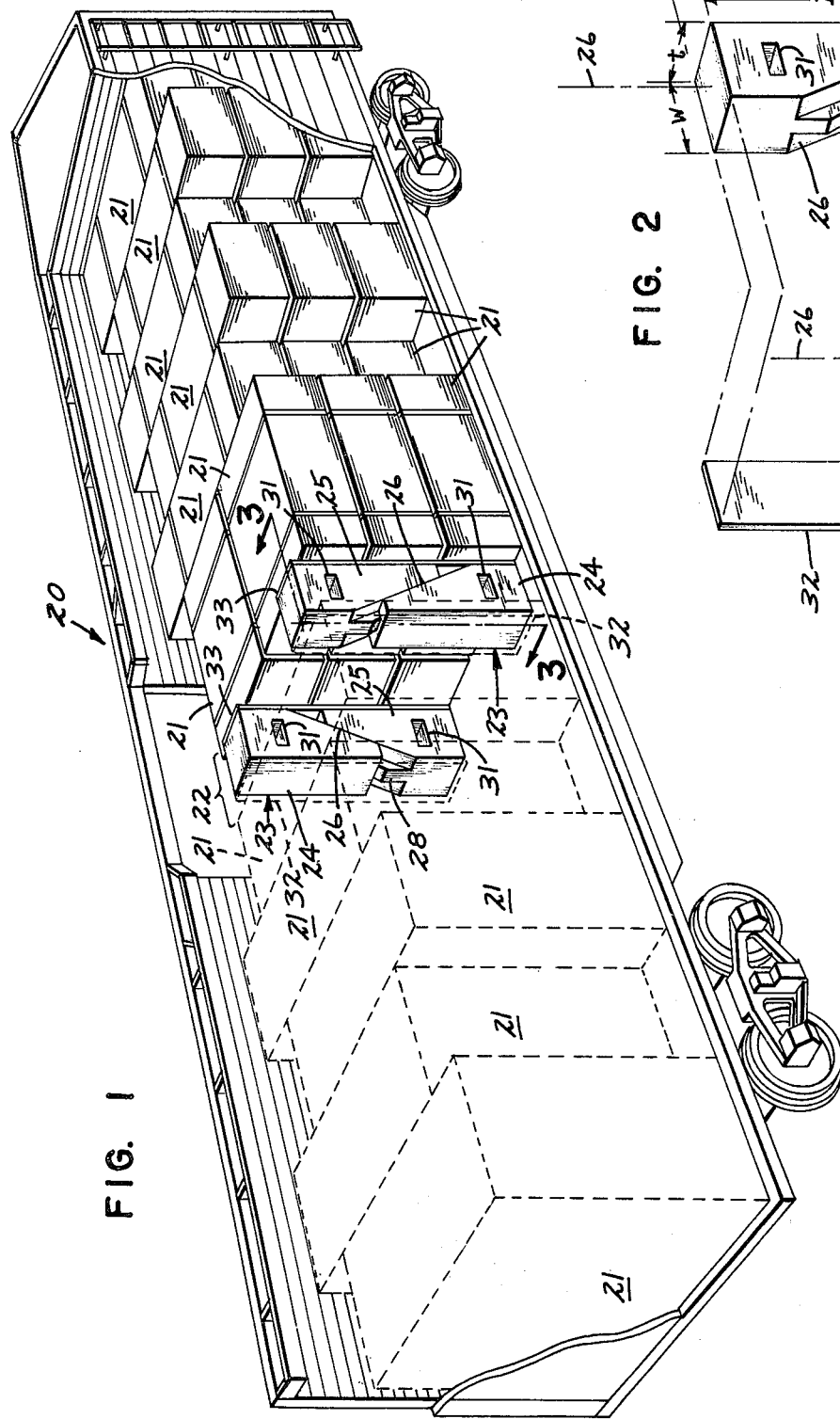
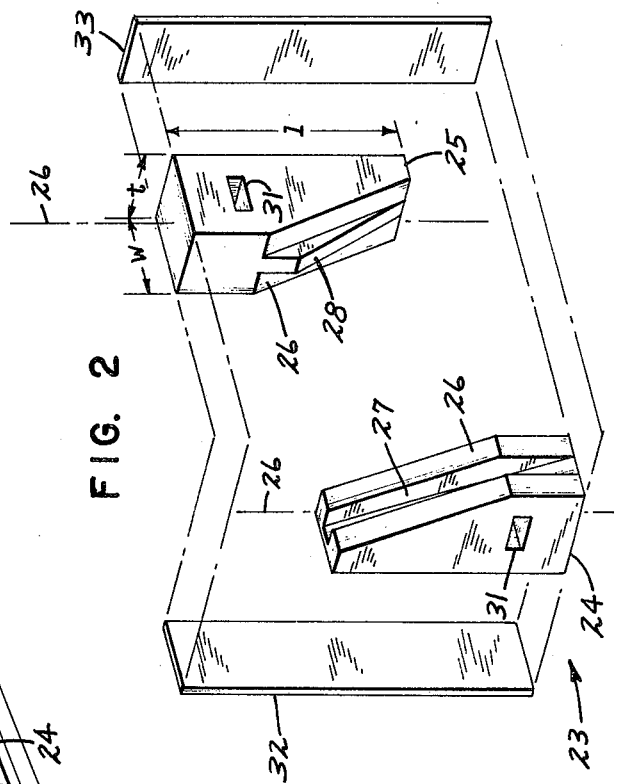
FIG. 1
FIG. 2

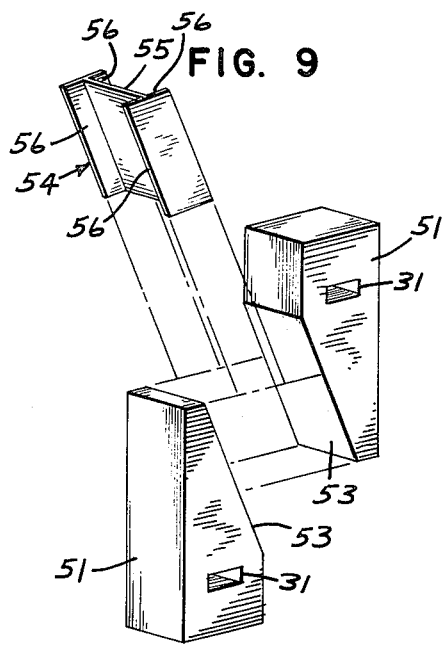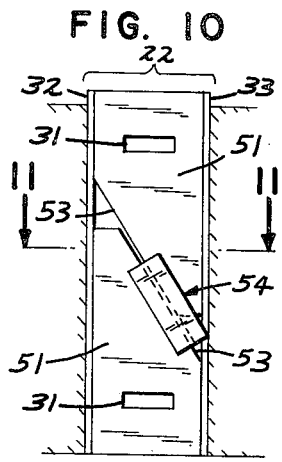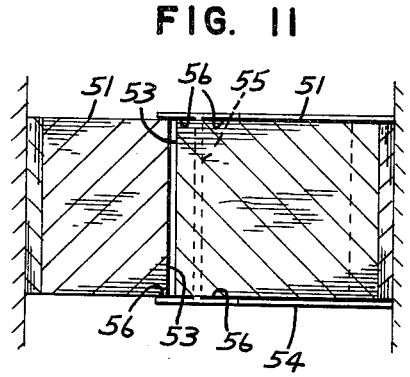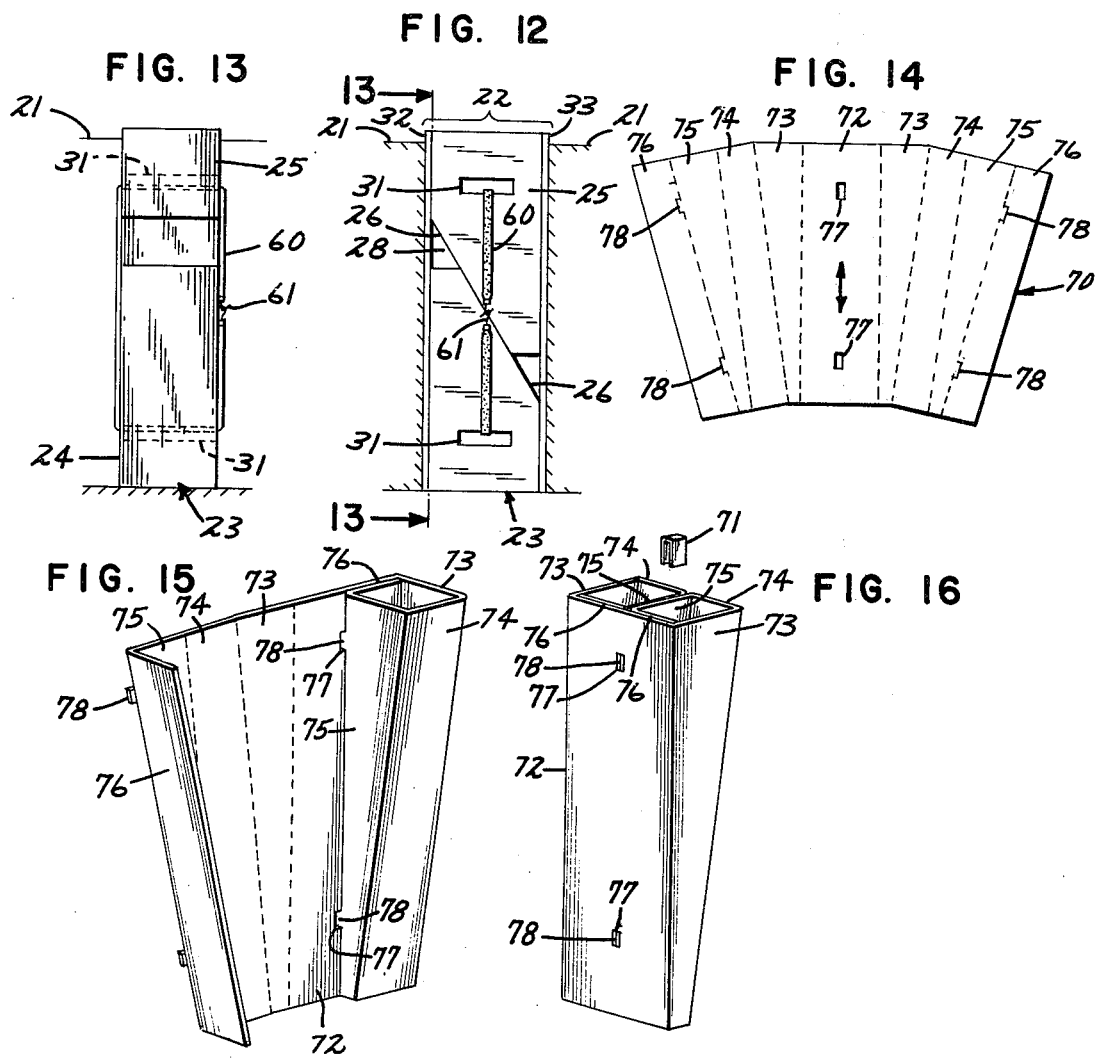

DUNNAGE FILLER

BACKGROUND OF THE INVENTION

This invention relates to the field of transportation, and more particularly to means for the protection of lading being transported in vehicles from damage resulting from shifting of the lading due to impacts and oscillations of transportation.

In the course of loading cargo into transportation vehicles for carriage, voids inevitably develop as a result of the relations between dimensions of cargo elements and the dimensions of the vehicles themselves. If compensation is not made for these voids after loading is completed, by dunnage appropriate to hold the lading in place approximately as loaded, the lading during subsequent movement of the vehicle in transit will move within and in relation to the vehicle. Damage of the vehicle by the lading, and of the lading by the vehicle, as well as mutual damage by lading elements, is the result.

No matter how tightly a given lading is loaded in a given vehicle, small spaces are incrementally distributed longitudinally, laterally, and vertically throughout the load, which have a tendency, under the dynamic forces present during transit, to close up as the load "tightens" and "shakes down". For example, the inside length of a railroad boxcar may be 50 feet, 6 inches, while the actual accumulated length of the lading may be 48 feet, consisting of 12 four foot long units: in practice the length of such a load can seldom be made closer than 48 feet 6 inches. This leaves a two foot initial void space which must be filled if the lading elements are to be prevented from shifting with consequent damage.

Some sort of separator, box, strap, or dunnage is required to fill this void. If a fixed separator two feet long is inserted in the void before transit, which is a common practice, the load may tighten up in transit so that there is as much as 6 inches of additional void created, which permits the lading elements to slide and slam into each other, the separators, and the vehicle, frequently damaging some or all of these.

The "floating" concept of lading has been proposed to overcome this. According to this concept, the lading is positioned in the vehicle spaced from the vehicle walls by more than the mean distance the load can be expected to shift in each direction during transit. Movements of the lading are converted to sliding friction between the lading and the car floor. This is a rather uncertain lading protection arrangement, and makes rather inefficient use of the floor area of the car.

Dynamic devices have also been proposed such as expanding mechanical panels linked by mechanically loaded connectors, inflatable paper or rubber bags, used alone or incorporated between two panels, and various belt or strap devices attached to the car which suspend the lading in such a way as to transfer peak force loadings away from the lading. Semi-permanent accessories such as load dividers, bars, air expanded panels, and bolt attachments to transport vehicles have the disadvantage of being expensive and subject to loss, damage, and vandalism, thus requiring replacement. On the other hand, disposable accessories raise a serious problem at locations where a great quantity of goods is regularly received, and physical disposal of "disposable" accessories must be accomplished by haulage to a remote dumping area.

SUMMARY OF THE INVENTION

I have devised a dunnage device which is convenient, reusable if removed with care, capable of sustaining some damage without becoming useless, and inexpensive enough to dispose of if one-trip use is all that is desired, and which is constructed of conveniently availabe material which is recyclable and which will not damage cargo if the latter is exposed by damage to its own protective packing.

This I accomplish by providing pairs of complimentarily positioned wedge members, one above the other, in the cargo space voids, so that vertical movement of the upper member causes increase in the transverse dimension of the pair. In a preferred embodiment the members are solid blocks of corrugated cardboard material, the contact surfaces having components of direction perpendicular to the length of the corrugations, and the angle being such that it is easy for the upper wedge member to slide downward, in response to gravity, if the void increases in size, but difficult for the upper wedge member to reverse its direction of movement if the void attempts to contract. This can be augmented by elastic elements passing through apertures in the members intending to draw them together. I also provide means to prevent relative movement between the two members of each pair, other than movement along the contacting surface. Another embodiment uses the same material in sheet form, and shapes and folds the sheets to form wedge members similar to those just described, but of less weight.

Various advantages and features of novelty which characterize my invention are pointed out with particularity in the claims annexed hereto and forming a part thereof. However, for better understanding the invention, its advantages, and objects attained by its use, reference should be had to the drawing which forms a further part of hereof, and to the accompanying descriptive matter, in which there are illustrated and described certain preferred embodiments of the invention.

BRIEF DESCRIPTION OF DRAWING

In the drawing

FIG. 1 is an isometric showing of a railroad boxcar filled with lading and making use of my invention, parts being broken away or suggested in broken lines for clarity of illustration, FIG. 2 is an isometric exploded view of one embodiment of the invention, FIG. 9 is an isometric expanded view of a further embodiment of the invention, FIG. 10 is a side view of the embodiment of FIG. 9, FIG. 11 is a sectional view taken along the line 11—11 of FIG. 10, FIGS. 12 and 13 are side and front views of the invention showing a further application, FIG. 14 is a developmental view of a further embodiment of the invention, FIG. 15 shows the structure of FIG. 14 partly formed, and FIG. 16 shows that structure fully formed.

DESCRIPTION OF THE PREFERRED EMBODIMENT

Figure 3:
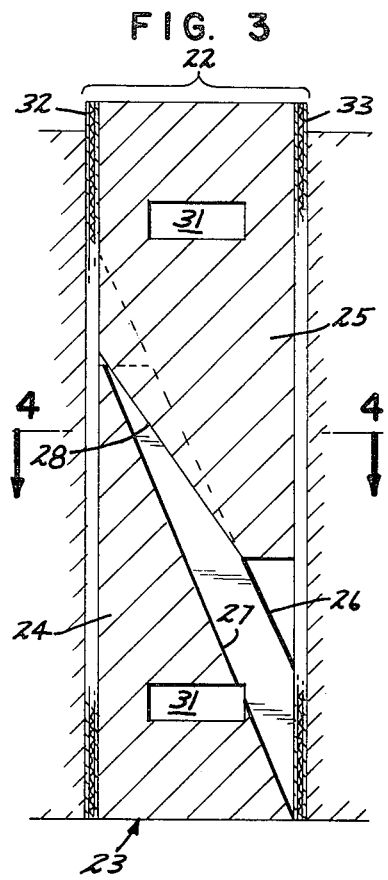
FIG. 3 is a vertical section of my dunnage filler taken along the line 3—3 of FIG. 1.

For illustrative purposes only, my invention is shown in use in a railroad boxcar 20, FIG. 1. The car is loaded with bundles 21 of plywood of various widths, piled one on top of another, and the piles are arranged side by side in contact with one another. The ends of alternate piles are in contact with opposite walls of the car, so that by their mutual friction they tend to remain in position laterally. The car is loaded from both ends, the lading in the left hand end being suggested in broken lines. When the car is full, there are a number of voids along the sides of the car, a void between the load and the car roof, and a central void near the doors, indicated by the bracket 22. The overhead void may be disregarded as far as lading shift is concerned, and the lateral voids are also of less importance, for this loading at least, but it is essential to take some steps to fill the void 22, since longitudinal impacts are the most severe in transportation of this sort, and lading shift in this direction is most conductive to damage both to car and to cargo.

Dunnage fillers 23 according to my invention are used in the void 22, as shown in FIGS. 1-5. Each filler includes a pair of wedge members 24 and 25, complimentarily positioned one above the other: it is immaterial which is in the lower position. Each member is in the form of a rectangular hexahedron of length 1, width w, and thickness t, elongated along an axis 26, and truncated diagonally by a plane making a small acute angle with the axis and defining a rectangular truncation surface 26 having short sides orthogonal to said axis. In one form of the invention later to be discussed, the truncation surfaces are unmodified. In the embodiment shown FIGS. 1-5 member 24 has a longitudinal groove in its truncating surface 26, and member 25 has a matching longitudinal tongue 28.

I have found that wedge members 24, 25 are advantageously constructed of corrugated cardboard. This material is quite strong, not unduly heavy, and readily available. It can suffer local damage without being totally affected, it has the same physical properties as the cartons in which much cargo is enclosed for its protection, and hence is less likely to damage the cargo enclosures: moreover, if a cargo enclosure is damaged, contact of the contents with a dunnage filler of corrugated cardboard will not result in serious cargo damage. Furthermore, dunnage fillers of this material are easily disposed of since they are readily recycled.

Figure 4:
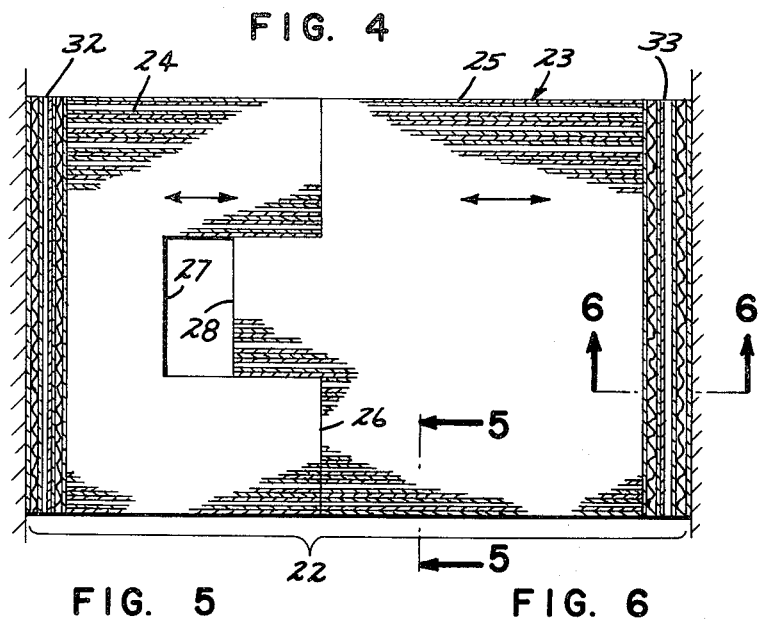
FIG. 4 is a horizontal section taken along the line 4—4 of FIG. 3, FIGS. 5 and 6 are fragmentary sections along the lines 5—5 and 6—6 respectively of FIG. 4.
Figures 5, 6:
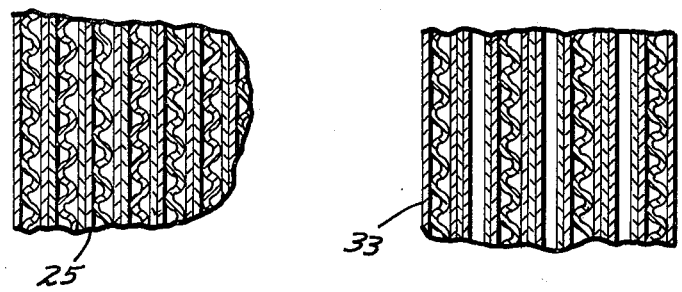

As shown in FIG. 4, I prefer to make members 24 and 25 of solid corrugated cardboard glued layer upon layer with the usual inter-sheets. I arrange the material so that the length of the corrugations is aligned with the width of the wedge member. The truncation surface is then rough rather than smooth: this together with the acute angle of the truncation plane results in contact surfaces which permit the upper member to slide down rather readily by gravity, while resisting strongly any reverse movement.

Solid blocks of corrugated cardboard of this magnitude are not light. Accordingly, I form in each wedge member an aperture 31 sized to receive the prong of a lift truck. Thus only the finally positioning of the member need be done manually.

My dunnage filler is used with a pair of contact members 32, 33, which may also be of corrugated cardboard. I prefer these members however, to be constructed in the more conventional manner, that is, with alternate layers having the corrugations running orthogonally, as suggested in FIG. 6. In use, after the car is loaded to leave only the central void 22 I place a first contact member 32 against the cargo on one side, and position a wedge member 24 lengthwise against it. Next, another contact member 33 is positioned against the cargo opposite member 32, and wedge member 25 is positioned on member 24 with their truncation surfaces in contact and their axes parallel, and with tongue 28 in groove 27: if head room is lacking to do this, the wedge member may be assembled and then moved into the space between the contact members. Now by allowing member 25 to move downward the contact members are spread apart, and the engagement between the truncation surfaces maintains this condition. If necessary, second and third dunnage fillers may be used side by side in void 22.

It is also apparent that dunnage fillers may be used in the lateral voids if additional security is desired, and the filler dimensions are suitable. By way of example, one useful set of wedge members was 5 feet long, 20 inches wide, and 24 inches thick, the groove being 8 inches wide and 4 inches deep, and the truncation surface extending from a line 12 inches from one end to a line 4 inches from the opposite edge. With these dimensions a filler can be adjusted to fit a space between contact members ranging between 20 inches and 28 inches. It is desirable to use as many contact members as are necessary to leave a space between them as near to twenty inches as can be. By doing so, the initial space occupied by the wedge members will be not much more than their minimum width, and a maximum amount of adjustment is available as the load compacts, to take up the resulting increase in the central void.

Other dimensions may also be used, of course, as appear to be called for by the varieties of lading encountered.

Figure 7:
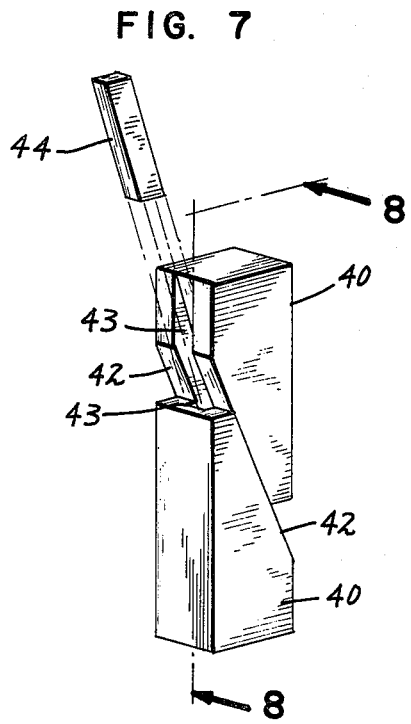
FIG. 7 is an isometric view of a second embodiment of the invention.
Figure 8:
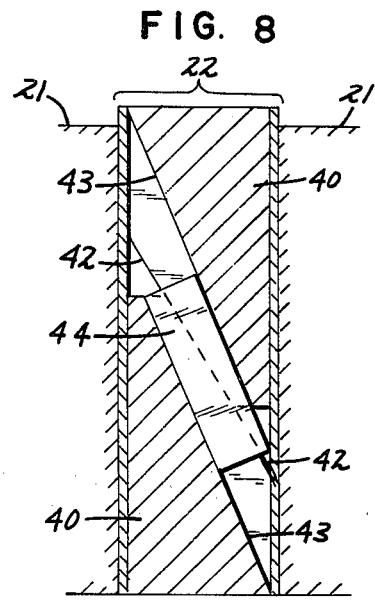
FIG. 8 is a vertical section along the line 8—8 of FIG. 7.

The function of groove 27 and tongue 28 is to prevent any relative movement between wedge members 24 and 25 other than sliding movement along the truncation surfaces. A second embodiment of the invention, shown in FIGS. 7 and 8, has identical wedge members 40, with truncation surfaces 42 having identical grooves 43. Undesired relative movement between the wedge members is prevented by a separate key 44 of the same material that fits in the grooves.

FIGS. 9-11 show a further embodiment of the invention in which identical wedge members 51 have unmodified truncation surfaces 53. In this structure, unwanted relative movement between the wedge members is provided by an elongated keying member 54 of generally H-shaped cross section, which may be built up of corrugated cardboard, or extruded in plastic if desired. The cross bar 55 of the H is placed between the truncation surfaces, and the inside surfaces 56 of the legs engage the faces of the wedge members to control relative movement between them.

There may be loading conditions in which gravity cannot be fully relied on to maintain the wedge members in position. When this situation occurs, an elastic member 60 may be passed through the two apertures 31 in the blocks, and linked to itself as shown in 61 in FIGS. 12 and 13.

The wedge members discussed thus far have the disadvantage of considerable weight, and are intended for repeated use. A lighter weight form of this invention primarily for single use is shown in FIGS. 14–16. A sheet 70 of corrugated cardboard is cut to the outline shown in FIG. 14, the directions of corrugations being preferably as shown by the arrow. By successive right angle folds in the same direction the structure passes through the stage shown in FIG. 15 to completion as in FIG. 16, a clip 71 of plastic or other suitable material sufficing to retain the final form. A wedge member of this sort has a rectangular back 72, a pair of triangular sides 73, a pair of rectangular half faces 74, a pair of triangular center ribs 75, and a pair of returns 76. Back 72 is apertured at 77 to receive tabs 78 projecting from the returns when the structure is fully formed. This embodiment of the invention is intended for use with a keying member such as member number 54 of FIG. 9, and is not ordinarily provided with apertures 31 of FIG. 2.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In a dunnage device, a pair of wedge members in the form of rectangular hexahedrons each elongated along a principal axis and truncated at an acute angle to said axis so that the surface of the truncation is a rectangle having shorter sides orthogonal with said axis, said members being positioned so that the truncation surfaces are in contact and the principal axes are parallel;
and means limiting relative movement between said members to sliding movement in the direction of the longer sides of said surfaces.

2. The structure of claim 1 in which said members are of corrugated cardboard.

3. The structure of claim 1 in which said members are solid blocks of corrugated cardboard.

4. The structure of claim 3 in which the lengths of the corrugations are generally perpendicular to the principal axes of the members.

5. The structure of claim 3 in which the last named means comprises a longitudinal groove in the truncation surface of one of said members and a mating longitudinal tongue projecting from the truncation surface of the other said members.

6. The structure of claim 1 in which said last named means comprises longitudinal grooves in the truncation surfaces of said members and a mating elongated feather slidable in said grooves.

7. The structure of claim 1 in which the last named means comprises an elongated locking piece of generally H-shaped cross-section, the cross bar of said piece extending laterally of and engaging the truncation surfaces, and the inner portions of the legs of said piece engaging the outer faces of said members.

8. The structure of claim 2 in which each said member is formed from a sheet of corrugated cardboard by repeated right angle folds in the same direction to form a hollow body having a rectangular back, a pair of triangular sides, a pair of rectangular half faces, and pair of center ribs, said center ribs including spaced tabs and said back having openings to receive said tabs.

9. The structure of claim 8 with means securing said half faces in coplanar relation.

10. The structure of claim 1 in which each of said members is provided with an aperture, at a location remote from the truncation, sized to receive the blade of a lift truck, the axis of said aperture being generally orthogonal with said principal axis and generally parallel to the truncation surfaces.

11. The structure of claim 10 together with means passing through said apertures and resiliently drawing the members of said pair toward one another.

12. The method of loading a vehicle to minimize damage to lading from shifting due to transportation impacts and oscillation which comprises:
filling the vehicle so that end lading elements engage end walls of the vehicle and intermediate lading elements contact each other, leaving a central space between the halves of the lading,
filling the central space with dunnage devices made up of pairs complimentarily positioned wedge members one above the other which have diagonal contact surfaces so that if the lading shifts to increase the central space, the upper wedge members slide downwardly on the lower wedge members to fill the increased central space, the angle of the diagonal being such as to oppose upward sliding movements of the upper wedge members in response to a tendency of the lading to move towards the center space,
and preventing lateral relative movement of said members in a direction transverse to said contact surfaces.

13. The method of loading a vehicle to minimize damage to lading from shifting due to transportation impacts and oscillations which comprises:
inserting into a lading void a dunnage device made up of a pair of complimentarily positioned wedge members one above the other, which have diagonal contact surface so that if the lading shifts to increase the void the upper wedge member may slide downwardly on the lower wedge member to fill the void resulting from the shift of lading,
and preventing lateral movement of said members in a direction transverse to said truncation surface.

* * * * *